United States Patent
Ono

(10) Patent No.: US 10,643,108 B2
(45) Date of Patent: *May 5, 2020

(54) IMAGE PROCESSING DEVICE, IMAGE PROCESSING METHOD AND RECORDING MEDIUM

(71) Applicant: FUJIFILM CORPORATION, Tokyo (JP)

(72) Inventor: Hiroaki Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,981

(22) Filed: Jan. 7, 2019

(65) Prior Publication Data
US 2019/0138857 A1    May 9, 2019

Related U.S. Application Data

(62) Division of application No. 15/248,570, filed on Aug. 26, 2016, now Pat. No. 10,210,431.

(30) Foreign Application Priority Data

Sep. 18, 2015 (JP) ................. 2015-184882

(51) Int. Cl.
*G06K 9/62* (2006.01)
*G06K 9/00* (2006.01)

(52) U.S. Cl.
CPC ....... *G06K 9/6267* (2013.01); *G06K 9/00677* (2013.01); *G06K 2209/27* (2013.01)

(58) Field of Classification Search
CPC ........ G06F 16/50; G06F 16/58; G06F 16/583; G06F 16/5854; G06F 16/5866;
(Continued)

(56) References Cited

U.S. PATENT DOCUMENTS 5,659,494 A   8/1997  Chmielewski et al.
8,068,678 B2  11/2011 Tobita et al.
(Continued)

FOREIGN PATENT DOCUMENTS

JP   H07-287703 A   10/1995
JP   2011-060155 A   3/2011
JP   4643735 B1   3/2011

OTHER PUBLICATIONS

Shen, Jialie, et al. "Multimedia tagging: past, present and future." Proceedings of the 19th ACM International Conference on Multimedia. ACM, 2011.
(Continued)

*Primary Examiner* — Geoffrey E Summers
(74) *Attorney, Agent, or Firm* — Studebaker & Brackett PC

(57) ABSTRACT

In the image processing device, the image processing method and the recording medium, the image analyzer carries out image analysis on an image. The tag information assignor assigns the image with tag information corresponding to objects present in the image based on the result of the image analysis. The first assignment ratio calculator calculates an assignment ratio of common tag information assigned to images owned by users as the first assignment ratio. The second assignment ratio calculator calculates an assignment ratio of the common tag information assigned to images owned by each user as the second assignment ratio. And the tag ranking determiner ranks the common tag information assigned to images owned by the user based on the difference between the first assignment ratio and the second assignment ratio of the common tag information.

19 Claims, 4 Drawing Sheets

(58) Field of Classification Search
CPC .............. G06F 16/587; G06F 16/5838; G06K 9/00677; G06K 9/6267; G06K 2209/27
USPC ........................................................ 382/305
See application file for complete search history.

(56) References Cited

U.S. PATENT DOCUMENTS

| | | |
|---|---|---|
| 8,707,160 B2 | 4/2014 | Sadagopan et al. |
| 9,081,798 B1 | 7/2015 | Wong |
| 2006/0242139 A1 | 10/2006 | Butterfield et al. |
| 2011/0072047 A1 | 3/2011 | Wang et al. |
| 2013/0148864 A1 | 6/2013 | Dolson et al. |
| 2016/0275372 A1 | 9/2016 | Goodwin et al. |

OTHER PUBLICATIONS

Zhang, Dengsheng, Md Monirul Islam, and Guojun Lu. "A review on automatic image annotation techniques." Pattern Recognition 45.1 (2012): 346-362.

"Ratio, n." OED Online. Oxford University Press, Jun. 2018. Web. Jun. 8, 2018.

Hotho, Andreas, et al. "Folkrank: A ranking algorithm for folksonomies." Lwa. vol. 1. 2006.

Liu, Dong, et al. "Tag ranking." Proceedings of the 18th International Conference on World Wide Web. ACM, 2009.

IMAGE PROCESSING DEVICE, IMAGE PROCESSING METHOD AND RECORDING MEDIUM

CROSS-REFERENCE TO RELATED APPLICATIONS

The present application is a Divisional Application of Ser. No. 15/248,570 filed Aug. 26, 2016, which claims priority under 35 U.S.C. § 119 to Japanese Patent Application No. 2015-184882, filed on Sep. 18, 2015. The above application is hereby expressly incorporated by reference, in its entirety, into the present application.

BACKGROUND OF THE INVENTION

The invention relates to an image processing device, an image processing method and a recording medium for ranking a piece of tag information assigned to an image owned by a user.

Nowadays, there has been realized an automatic layout function that automatically selects a certain number of images in each of which a person is well photographed from numerous images owned by a user, and automatically generates a synthetic image for a calendar, an electronic album, a screen saver or the like using the selected certain number of images. The automatic layout function enables the user to easily produce a synthetic image without the bother of manually selecting images from those owned by the user.

However, the conventional automatic layout function does not rank a non-person object present in an image and therefore cannot rank an image including an object. In addition, since an object is not ranked, the conventional automatic layout function cannot rank an image in which a person and an object are both present in consideration of not only whether the person is well or poorly photographed but also importance of the object.

Now, JP 2011-60155 A, JP 4643735 B and JP 7-287703 A are mentioned as literatures related to the present invention.

JP 2011-60155 A describes extracting an object included in an image provided, identifying the extracted object, and extracting a tag corresponding to the object.

JP 4643735 B describes determining attributes of contents by analyzing features of the contents, storing information on the content and information showing the determined attribute of the content in a material information database, and calculating, with respect to each of the determined attributes, a sum of numbers of contents in each of initial groups including a content which has the attribute.

JP 7-287703 A describes obtaining the sum SUM resulting from summing of the intensity values of pixels, obtaining a mean value Aver from the sum SUM, and for every pixel value P, obtaining an absolute value of a difference between the pixel value P and the mean value Aver.

SUMMARY OF THE INVENTION

However, the prior art including JP 2011-60155 A, JP 4643735 B and JP 7-287703 A did not have a concept of ranking a piece of tag information assigned to an image in accordance with an object present in the image owned by a user, that is, ranking an object corresponding to a piece of tag information.

An object of the invention is to overcome the above problem of the prior art and provide an image processing device, an image processing method and a recording medium capable of ranking a piece of tag information assigned to an image owned by a user in order of importance for the user.

In order to attain the object described above, the present invention provides an image processing device including:

an image analyzer configured to carry out image analysis on an image;

a tag information assignor configured to assign the image with one or more pieces of tag information corresponding to one or more objects present in the image based on a result of the image analysis;

a first assignment ratio calculator configured to calculate an assignment ratio of each piece of common tag information assigned to images owned by a plurality of users as a first assignment ratio, the each piece of common tag information being a piece of tag information assigned to and shared by images owned by the plurality of users;

a second assignment ratio calculator configured to calculate an assignment ratio of the each piece of common tag information assigned to images owned by each user as a second assignment ratio; and a tag ranking determiner configured to rank the each piece of common tag information assigned to images owned by the each user based on a difference between the first assignment ratio and the second assignment ratio of the each piece of common tag information.

Also, the present invention provides an image processing method including:

a step of carrying out image analysis on an image, with an image analyzer;

a step of assigning the image with one or more pieces of tag information corresponding to one or more objects present in the image based on a result of the image analysis, with a tag information assignor;

a step of calculating an assignment ratio of each piece of common tag information assigned to images owned by a plurality of users as a first assignment ratio, with a first assignment ratio calculator, the each piece of common tag information being a piece of tag information assigned to and shared by images owned by the plurality of users;

a step of calculating an assignment ratio of the each piece of common tag information assigned to images owned by each user as a second assignment ratio, with a second assignment ratio calculator; and a step of ranking the each piece of common tag information assigned to images owned by each user based on a difference between the first assignment ratio and the second assignment ratio of the each piece of common tag information, with a tag ranking determiner.

Further, the present invention provides a non-transitory computer readable recording medium having recorded thereon a program for causing a computer to execute each step of the image processing method described above.

According to the invention, a difference between the first assignment ratio and the second assignment ratio of a piece of common tag information is calculated, and an assignment ratio of the piece of common tag information is compared between a user and other users, whereby a piece of common tag information, i.e., an object that is highly important for each user can be determined. In this manner, a piece of tag information assigned to an image owned by a user can be ranked in order of importance for the user.

DETAILED DESCRIPTION OF THE INVENTION

An image processing device, an image processing method and a recording medium of the invention are described below in detail with reference to preferred embodiments shown in the accompanying drawings.

Figure 1:
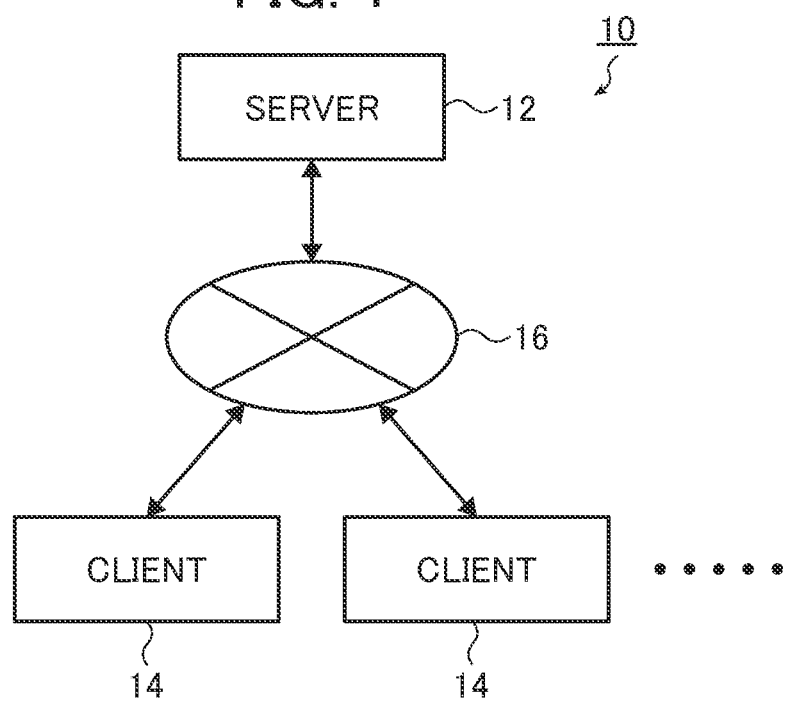
FIG. 1 is a block diagram showing an embodiment of the configuration of an image processing system of the invention.

FIG. 1 is a block diagram showing an embodiment of the configuration of an image processing system of the invention. The image processing system 10 shown in FIG. 1 ranks a piece of tag information based on an assignment ratio of the piece of tag information assigned to images owned by a user. The image processing system 10 includes a server 12 and one or more clients 14 connected to the server 12 via a network 16 such as the Internet.

Figure 2:
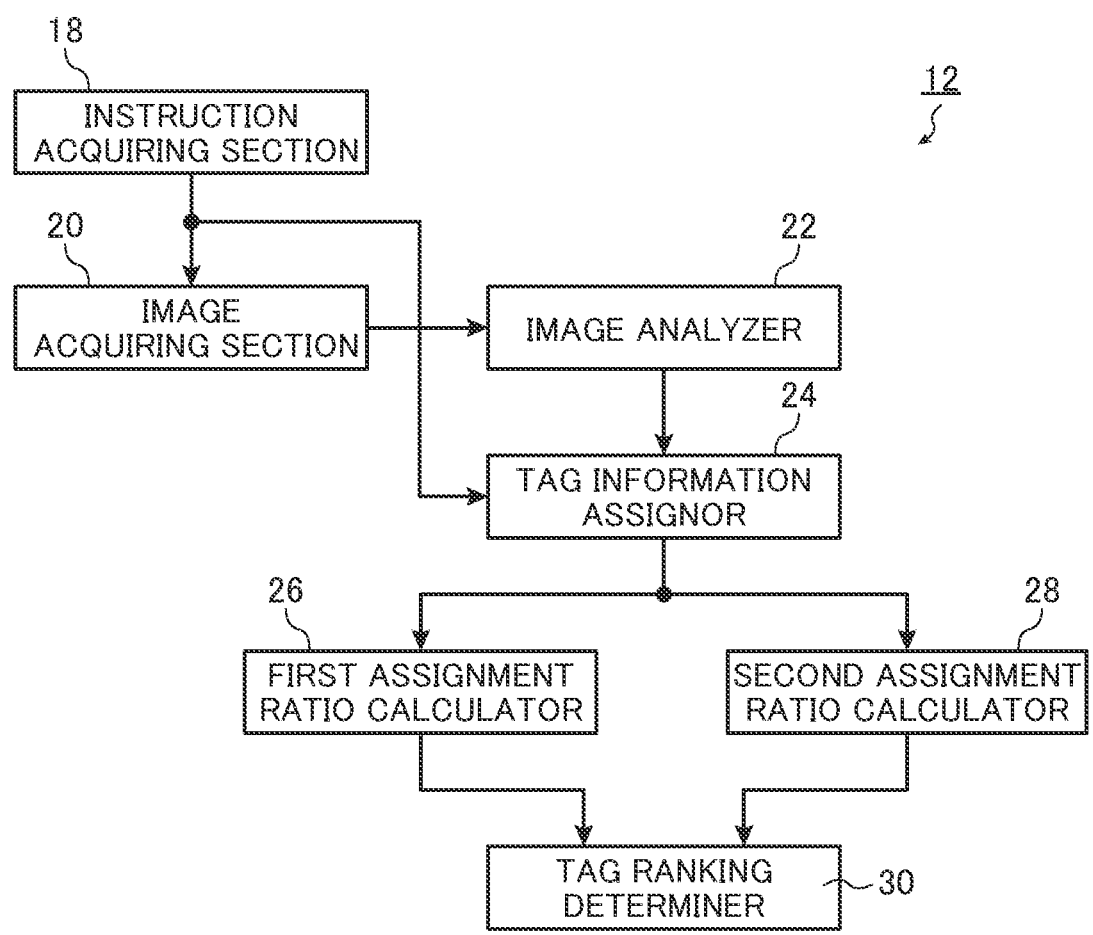
FIG. 2 is a block diagram showing an embodiment of the configuration of a server shown in FIG. 1.

FIG. 2 is a block diagram showing an embodiment of the configuration of a server shown in FIG. 1. The server 12 shown in FIG. 2 is an example of the image processing device of the invention and includes an instruction acquiring section 18, an image acquiring section 20, an image analyzer 22, a tag information assignor 24, a first assignment ratio calculator 26, a second assignment ratio calculator 28 and a tag ranking determiner 30.

In the server 12, the instruction acquiring section 18 acquires an instruction input by a user.

The instruction acquiring section 18 acquires, from the client 14 via the network 16, various instructions the user has input at the client 14. The user's instructions include an instruction for specifying an image to be processed and an instruction for specifying a piece of tag information.

The image acquiring section 20 acquires an image owned by the user based on the user's instruction acquired by the instruction acquiring section 18.

The image acquiring section 20 may acquire an image that is uploaded from the client 14 of the user to the server 12 via the network 16 in response to the user's instruction or acquire a second image or second images including at least a part of images specified in response to the user's instruction from a first image or first images already uploaded to, i.e., already held by the server 12.

The image analyzer 22 carries out image analysis on the image acquired by the image acquiring section 20.

The image analysis carried out by the image analyzer 22 includes, in addition to detection of a person and a non-person object that are present in an image, detection of positions and areas of regions where a person and an object lie in the image, or the like.

The tag information assignor 24 assigns each image with one or more pieces of tag information corresponding to one or more objects present in the image based on the result of the image analysis carried out by the image analyzer 22.

Based on the result of the image analysis, for example, when presence of an object "apple" in an image is detected, the tag information assignor 24 assigns the image with "apple" tag information. The piece of tag information may be named the same as the object or a name different from the object. Moreover, an image may be assigned with a piece of tag information having an arbitrary name specified in accordance with a user's instruction.

The first assignment ratio calculator 26 calculates an assignment ratio of each piece of common tag information assigned to and shared by images owned by a plurality of users as a first assignment ratio.

Further, the second assignment ratio calculator 28 calculates an assignment ratio of each piece of common tag information assigned to images owned by each user as a second assignment ratio.

Each user registers account information including the user's name, address, user identifier (ID) and password, for example, in the image processing system 10. In order to use the image processing system 10, each user inputs the user ID and the password to log in to the image processing system 10. Accordingly, the image processing system 10 can identify each user and an image owned by each user based on the account information of each user.

The common tag information may be a piece of tag information that is assigned to and shared by images owned by a plurality of users in accordance with an ordinary, non-person object present in images, such as "ocean," "mountain," "apple" or "cat". On the other hand, specific tag information (individual tag information) dedicated to each user (person) may be a piece of tag information that is assigned to an image in accordance with a specific person or a specific object present in the image, such as "Taro" or "Hanako".

Further, an assignment ratio of a piece of common tag information refers to a ratio of the number of assignments of a piece of common tag information assigned to images with respect to the number of images owned by a user.

For instance, the second assignment ratio calculator 28 can calculate the second assignment ratio of each piece of common tag information for each user by dividing the number of assignments of the piece of common tag information assigned to images owned by the user by the number of images owned by the user.

In addition, the first assignment ratio calculator 26 can calculate the first assignment ratio of each piece of common tag information by summing up the second assignment ratios of a piece of common tag information assigned to images owned by a plurality of users and averaging the sum.

Subsequently, the tag ranking determiner 30 ranks each piece of common tag information assigned to images owned by each user based on a difference between the first assignment ratio and the second assignment ratio of the piece of common tag information.

For instance, the tag ranking determiner 30 can subtract the first assignment ratio from the second assignment ratio to calculate the difference therebetween for each piece of common tag information, and rank each piece of common tag information such that a piece of common tag information having a larger difference is higher in rankings.

The client 14 is a terminal device owned by each user, such as a personal computer, tablet computer or smartphone. Each client 14 includes an input unit such as a keyboard, a mouse or a touch panel, a display such as a liquid crystal display or a touch panel, and a controller that controls processing for causing the input unit to acquire instructions input by a user, processing for causing the display to display various pieces of information, and other processing.

The server 12 and the client 14 each have transmitting and receiving sections therein for transmitting and receiving various pieces of data between them via the network 16, although not described in this embodiment for avoiding the complexity.

Figure 3:
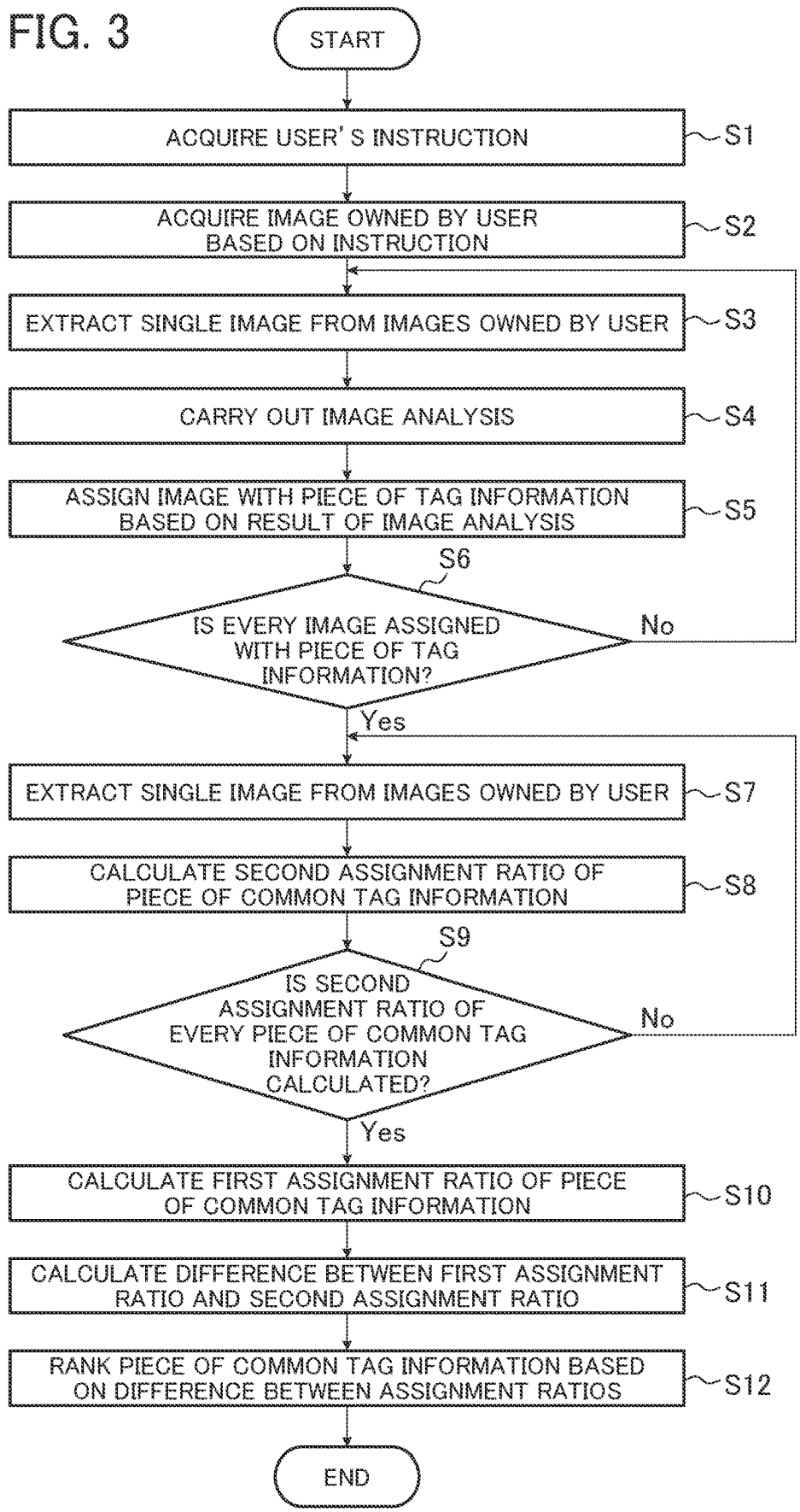
FIG. 3 is a flowchart showing an embodiment of the operation of the image processing system.

Next, the operation of the image processing system 10 for ranking a piece of common tag information assigned to images owned by a user is described with reference to the flowchart shown in FIG. 3.

First, at the client 14, a user inputs an instruction for specifying an image to be processed. The instruction is transmitted from the client 14 of the user to the server 12 via the network 16.

In the server 12, the instruction acquiring section 18 acquires the user's instruction transmitted from the client 14 of the user via the network 16 (Step S1).

Based on the user's instruction acquired by the instruction acquiring section 18, the image acquiring section 20 acquires an image or images owned by the user (Step S2).

Acquisition of an image or images described above is repeated for each of a plurality of users.

Subsequently, an image owned by the user is assigned with a piece of tag information.

For this step, first, one of the images owned by the user is extracted (Step S3).

Subsequently, the image analyzer 22 carries out image analysis on an image acquired by the image acquiring section 20 (Step S4), and the tag information assignor 24 assigns the image with a piece of tag information corresponding to an object present in the image based on the result of the image analysis (Step S5).

Here, it is determined whether every one of the images owned by the user is assigned with a piece of tag information (Step S6). Accordingly, when every one of the images owned by the user is not assigned with a piece of tag information ("No" at Step S6), the process returns to Step S3, and the above-described operation is repeated. On the other hand, when every one of the images owned by the user is assigned with a piece of tag information ("Yes" at Step S6), the process proceeds to Step S7.

Images owned by each of a plurality of users are assigned with pieces of tag information as described above.

Subsequently, the first assignment ratio and the second assignment ratio of each piece of common tag information are calculated.

For the step, first, one of the images owned by the user is extracted (Step S7).

Subsequently, the second assignment ratio calculator 28 calculates the second assignment ratio of each piece of common tag information for each user (Step S8).

Here, it is determined whether the second assignment ratio of every piece of common tag information is calculated for each user (Step S9). When the second assignment ratio of every piece of common tag information is not calculated ("No" at Step S9), the process returns to Step S7, and the above-described operation is repeated. On the other hand, when the second assignment ratio of every piece of common tag information is calculated ("Yes" at Step S9), the first assignment ratio calculator 26 then calculates the first assignment ratio of each piece of common tag information (Step S10).

Subsequently, a piece of common tag information is ranked.

For the step, first, the tag ranking determiner 30 subtracts the first assignment ratio from the second assignment ratio to calculate a difference therebetween for each piece of common tag information for each user (Step S11) and ranks the piece of common tag information based on the difference between the assignment ratios of the piece of common tag information (Step S12).

The image processing system 10 performs the above-described image analysis, assignment of tag information, calculation of the first and second assignment ratios and determination of a rank of a piece of common tag information every time a new image is added, for example.

Importance of an object corresponding to a piece of common tag information varies depending on the user, and a rank of a piece of common tag information assigned to images owned by a user shows importance of an object for the user. In other words, by ranking a piece of common tag information assigned to the images owned by the user, importance of an object for the user can be determined, and, further, an image including the object can be ranked.

For instance, discussed next is a case where the number of assignments of a piece of tag information assigned to images owned by each user is counted, and an object corresponding to a piece of tag information having a larger value of the counted number is determined to be more important for the user. In this case, an object that is ordinarily seen in a daily life has a larger value of the counted number and is determined to be more important for the user. However, normally, an object that is seen in a daily life is often present in images of any user and is not important for a particular user.

In this regard, in this embodiment, a difference between the first assignment ratio and the second assignment ratio of a piece of common tag information is calculated, and the assignment ratio of the piece of common tag information is compared between a user and other users, whereby a piece of common tag information, i.e., an object, having a high importance for the user can be determined. In this manner, a piece of tag information assigned to an image owned by a user can be ranked in order of importance for the user.

Next, the method for calculating the first assignment ratio and the second assignment ratio of a piece of common tag information and the method for ranking a piece of common tag information are described with reference to an example.

TABLE 1

| Common Tag Information | 2nd Assignment Ratio | 1st Assignment Ratio | Difference | Rank |
| --- | --- | --- | --- | --- |
| Apple | 0.8 | 0.3 | 0.5 | 1 |
| Banana | 0.7 | 0.8 | −0.1 | 4 |
| Football | 0.6 | 0.5 | 0.1 | 3 |
| Dog | 0.3 | 0.1 | 0.2 | 2 |
| Cat | 0.2 | 0.9 | −0.7 | 5 |
| — | — | — | — | — |

Table 1 shows the first and second assignment ratios of pieces of common tag information assigned to images owned by a user, a difference obtained by subtracting the first assignment ratio from the second assignment ratio, and ranks of the respective pieces of common tag information. For example, a piece of common tag information "apple" has the second assignment ratio of 0.8, the first assignment ratio of 0.3, a difference obtained by subtracting the first assignment ratio from the second assignment ratio of 0.5. Other pieces of common tag information are shown in the same manner.

As a piece of common tag information having a larger difference is ranked to be higher, the piece of common tag information "apple" with a difference of 0.5 is ranked as the first, followed by the piece of common tag information "dog" with a difference of 0.2, the piece of common tag information "football" with a difference of 0.1, the piece of common tag information "banana" with a difference of −0.1, and the piece of common tag information "cat" with a difference of −0.5 being ranked as the second, third, fourth and fifth.

TABLE 2

| Image (User 1) | Tag Information | | |
|---|---|---|---|
| 1 | Apple | Banana | Taro |
| 2 | Apple | Ocean | |
| 3 | Dog | Taro | |
| 4 | Mountain | Dog | Cat |
| 5 | Apple | Apple | Hanako |

TABLE 3

| Image (User 2) | Tag Information | | |
|---|---|---|---|
| 1 | Jiro | Star | |
| 2 | Jiro | Midori | Dog |
| 3 | Jiro | | |
| 4 | Jiro | | |
| 5 | Jiro | | |

TABLE 4

| Image (User 3) | Tag Information | | |
|---|---|---|---|
| 1 | Saburo | Baseball Bat | Ball |
| 2 | Apple | Orange | Peach |
| 3 | Ocean | Dog | |
| 4 | Saburo | | |
| 5 | Cat | | |

Tables 2 to 4 each show pieces of tag information (common tag information and individual tag information) assigned to five images owned by each of Users 1 to 3.

Image 1 of User 1 in Table 2 is assigned with pieces of tag information "apple," "banana" and "Taro." For example, the pieces of tag information "apple" and "banana" are pieces of common tag information, whereas the piece of tag information "Taro" is a piece of individual tag information. Other Images 2 to 5 are shown in the same manner. In addition, Images 1 to 5 of User 2 in Table 3 as well as Images 1 to 5 of User 3 in Table 4 are also shown in the same manner.

The piece of common tag information "apple" of User 1 is assigned once to Image 1, once to Image 2 and twice to Image 5, totaling four assignments. Thus, the second assignment ratio of the piece of common tag information "apple" of User 1 can be calculated by dividing the number of assignments of the piece of common tag information "apple" assigned to the images owned by User 1 by the number of images owned by User 1, i.e., 4/5=0.8. Similarly, the second assignment ratio of the piece of common tag information "apple" of User 2 is calculated as 0/5=0, while the second assignment ratio of the piece of common tag information "apple" of User 3 is calculated as 1/5=0.2.

In addition, the first assignment ratio of the piece of common tag information "apple" assigned to the images owned by Users 1 to 3 can be calculated by summing up the second assignment ratios of the piece of common tag information "apple" assigned to the images owned by Users 1 to 3 and averaging the sum, i.e., (0.8+0+0.2)/3≈0.3.

Accordingly, for the piece of common tag information "apple," the difference between the first assignment ratio and the second assignment ratio can be found by subtracting the first assignment ratio from the second assignment ratio, i.e., 0.8−0.3=0.5. A difference between the first assignment ratio and the second assignment ratio for any other piece of common tag information can be calculated in the same manner.

When a single image is assigned with a same piece of common tag information twice or more times like Image 5 in Table 2, the first assignment ratio calculator 26 and the second assignment ratio calculator 28 may regard the number of assignments of the same piece of common tag information assigned to the single image as the number of assignments of the piece of common tag information like in the embodiment or may regard the number of assignments of the same piece of common tag information assigned to the single image as one to calculate the first and second assignment ratios.

Next, described is an example where a rank of a piece of common tag information is utilized to determine a rank of an image.

Figure 4:
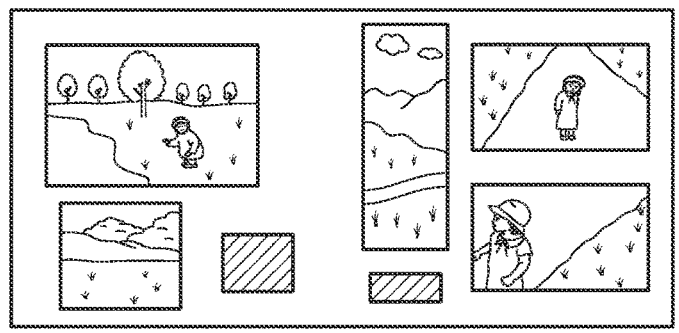
FIG. 4 is a conceptual diagram showing an example of a layout in a two-page spread page of an electronic album.

FIG. 4 is a conceptual diagram showing an example of a layout in a two-page spread page of an electronic album. As illustrated in FIG. 4, a plurality of images in different sizes are arranged at various positions vertically and horizontally in the page of an electronic album. Accordingly, the page layout sometimes has some empty spaces as shown by two shaded portions at the center bottom in FIG. 4. In such a case, an image selector capable of automatic layout provided to the server 12 automatically selects an image, e.g., an image in which an object is present, from images owned by a user, and arranges the selected image in an empty space in the page layout.

In order to select an image having an object to fill an empty space in a page layout of an electronic album with the selected image in this manner, a rank of a piece of common tag information according to the invention can be utilized. In this case, based on the rank of a piece of common tag information, the image selector can automatically select and use one or more images in which an object with high importance for a user is present from images owned by the user. As a result, the invention can provide a satisfying electronic album for the user.

In order to produce an electronic album consisting of a plurality of images, a rank of piece of common tag information according to the invention can be also utilized. In this case, in order to select one or more images having an object for use in an electronic album from images owned by a user, the image selector selects one or more images having an object corresponding to a piece of common tag information in order from the highest rank toward the lowest rank of pieces of common tag information.

Figure 5A:
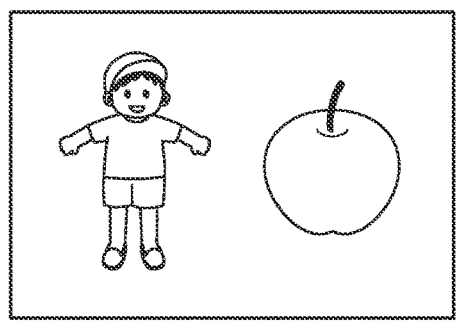
FIGS. 5A and 5B are conceptual diagrams showing an example of two images having a same constitution.
Figure 5B:
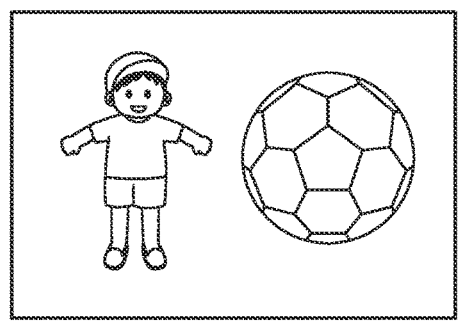

Next, FIGS. 5A and 5B are conceptual diagrams showing an example of two images having the same constitution. Each of the two images in FIGS. 5A and 5B shows a person on the left hand side, whereas FIG. 5A shows an apple and FIG. 5B shows a football on the right hand side. That is, the two images have the same constitution but are different in the object. In particular, the image in FIG. 5A has an object of an apple, and the image in FIG. 5B has an object of a football.

When two images having the same constitution as described above, the images can be ranked depending on the object using a rank of a piece of tag information according to the invention. In order to select one out of two images having the same constitution, the image selector can automatically select one including an object that is highly important for the user, i.e., the image that is satisfying for the user.

Similarly, in order to select a certain number of images from a plurality of images having the same constitution, a rank of a piece of common tag information according to the invention can be also utilized. For instance, in order to select one out of two or more images having the same constitution but different objects from images owned by a user, the image selector selects a single image having an object corresponding to the piece of common tag information in order from a highest rank toward a lowest rank of pieces of common tag information.

Moreover, when an image includes two or more objects each assigned with a piece of common tag information, an image ranking determiner capable of automatic layout provided to the server 12 may rank the image based on the ranks of pieces of common tag information assigned to images owned by each user.

For instance, when an image is assigned with two or more pieces of common tag information, the image ranking determiner may rank the image based on the rank of a piece of common tag information having the highest rank among the two or more pieces of common tag information.

Figure 6:
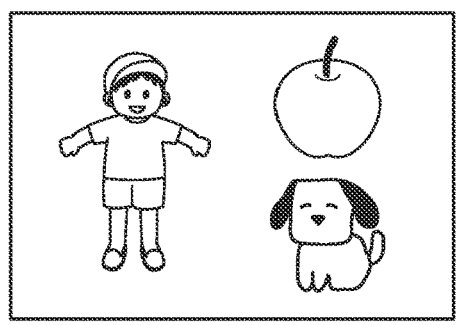
FIG. 6 is a conceptual diagram showing an example of an image assigned with pieces of common tag information "apple" and "dog".

For instance, as illustrated in FIG. 6, when an apple and a dog are present in an image, and the piece of common tag information "apple" has the higher rank than the piece of common tag information "dog," the image is ranked based on the rank of the piece of common tag information "apple."

Moreover, when an image is assigned with two or more pieces of common tag information, the image ranking determiner may rank the image based on the rank of a piece of common tag information corresponding to the sum of differences each between the first assignment ratio and the second assignment ratio of the two or more pieces of common tag information.

In an example as illustrated in FIG. 6, the difference between the first assignment ratio and the second assignment ratio of the piece of common tag information "apple" and the difference between the first assignment ratio and the second assignment ratio of the piece of common tag information "dog" are calculated, and the sum of the assignment ratio differences of the piece of common tag information "apple" and of the piece of common tag information "dog" is calculated. Thereafter, the image is ranked based on the rank of a piece of common tag information corresponding to the sum of the assignment ratio differences thus calculated.

Moreover, when an image is assigned with two or more pieces of common tag information, the image ranking determiner may rank the image based on the rank of a piece of common tag information corresponding to the sum of differences each between the first assignment ratio and the second assignment ratio of each of the two or more pieces of common tag information, the differences being weighted in accordance with areas of two or more objects corresponding to the two or more pieces of common tag information.

In the example as illustrated in FIG. 6, the area of the "apple" region and the area of "dog" region each occupy about 1/4 of the whole area of the image region. In this case, differences each between the first assignment ratio and the second assignment ratio of each of the pieces of common tag information "apple" and "dog" are weighted by 1/4, and the sum of the weighted differences each between the first assignment ratio and the second assignment ratio of each of the pieces of common tag information "apple" and "dog" is calculated. Thereafter, the image is ranked based on the rank of a piece of common tag information corresponding to the sum of differences thus calculated.

Moreover, when the image ranking determiner ranked an image based on the rank of a piece of common tag information, the image selector may select one or more images from images owned by a user based on the rank of an image.

The ranking of pieces of common tag information according to the invention can be adopted not only when one or more images are automatically selected from images owned by a user but also when all images owned by a user are used for producing an electronic album, for example.

Figure 7:
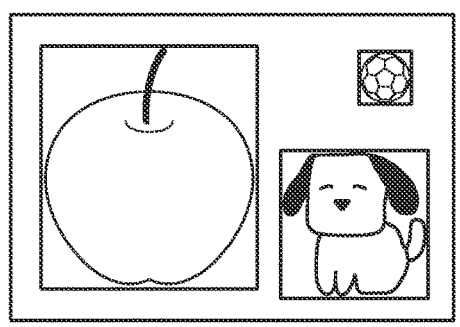
FIG. 7 is a conceptual diagram showing an example of a layout of a page in an electronic album.

FIG. 7 is a conceptual diagram showing an example of a layout of a page in an electronic album. In the layout illustrated in FIG. 7, images of an apple, a dog and a football are shown, gradually decreasing in size in this order.

When arranging images on a page in an electronic album, sizes of the images can be determined in accordance with importance of each image by utilizing the ranking of pieces of tag information according to the invention. In this case, an image layout section capable of automatic layout provided to the server 12 can produce a satisfying electronic album for a user by arranging images such that, when only objects are used to produce an electronic album, an image including an object with higher importance for the user is made larger in size and an image including an object with lower importance for the user is made smaller in size.

In this case, the image layout section arranges two or more images having objects in a page of an electronic album such that the size of an image with an object corresponding to a piece of common tag information having a higher rank is larger than the size of an image with an object corresponding to a piece of common tag information having a lower rank.

The tag information assignor 24 may select, from a certain number of pieces of tag information preliminarily set in the image processing system 10, a piece of tag information corresponding to an object present in an image and assign the image with the corresponding piece of tag information. Alternatively, an image may be assigned with a piece of tag information corresponding to an object present in the image, the piece of tag information being chosen from pieces of tag information designated from the outside in accordance with a user's instruction, in addition to a certain number of pieces of tag information preliminarily set.

It is not essential that the tag information assignor 24 assigns an image with a piece of tag information, but an image that has been preliminarily assigned with a piece of tag information may be used.

Like in the above-described embodiment, since the second assignment ratios of pieces of common tag information assigned to images owned by a plurality of users are summed and averaged to calculate the first assignment ratios, influences from a user owning an enormously large number of images compared to other users can be excluded.

However, in a case where tremendous users are involved, the total number of images owned by the users becomes so huge that an influence of the number of images owned by each user can be ignored. Therefore, the first assignment ratio calculator 26 may calculate the first assignment ratio for each piece of common tag information by dividing the number of assignments of a piece of common tag information assigned to images owned by a plurality of users by the number of images owned by the plurality of users.

For instance, while a user's preference may change with time, assuming that the user's latest preference should be more important for the user, it can be understood that an image of the user's latest preference has the higher importance than an image of the user's past preference. Accordingly, the first assignment ratio calculator 26 and the second assignment ratio calculator 28 may calculate the first assignment ratio and the second assignment ratio by weighting the number of assignments of each piece of common tag information such that the weight becomes smaller from the latest toward the past.

In addition, while a plurality of users may be all of the users registered in the image processing system 10, the plurality of users may be, for example, those in at least one of the groups categorized by country, by prefecture, by age and by gender, based on the account information on the respective users. By having users categorized into groups, users having similar tendency can be gathered into a single group, so a piece of common tag information can be ranked more precisely.

Although all functions corresponding to the image processing device of the invention are provided to the server 12 in the above-described embodiment, the invention is not limited thereto, and a part of or all of the functions may be provided to the client 14.

The device of the invention may be composed of constituent elements that are dedicated hardware devices or composed of a computer in which operations of the constituent elements are programmed.

The method of the invention can be carried out by, for instance, a program that causes a computer to implement steps of the method. A computer readable recording medium having the program recorded thereon may also be provided.

While the invention has been described above in detail, the invention is not limited to the above embodiment, and various improvements and modifications may be made without departing from the spirit and scope of the invention.

What is claimed is:

1. An image processing device comprising:
   an image analyzer configured to carry out image analysis on an image;
   a tag information assignor configured to assign the image with one or more pieces of tag information corresponding to one or more objects present in the image based on a result of the image analysis;
   a first assignment ratio calculator configured to calculate an assignment ratio of each piece of common tag information assigned to images owned by a plurality of users, which is a ratio of a number of assignments of the each piece of common tag information assigned to images owned by the plurality of users with respect to a number of images owned by the plurality of users, as a first assignment ratio, the each piece of common tag information being a piece of tag information assigned to and shared by images owned by the plurality of users;
   a second assignment ratio calculator configured to calculate an assignment ratio of the each piece of common tag information assigned to images owned by each user, which is a ratio of a number of assignments of the each piece of common tag information assigned to images owned by the each user with respect to a number of images owned by the each user, as a second assignment ratio;
   a tag ranking determiner configured to rank the each piece of common tag information assigned to images owned by the each user based on a difference between the first assignment ratio and the second assignment ratio of the each piece of common tag information;
   an image selector configured to select one or more images from images owned by a user based on a rank of the each piece of common tag information; and
   an image layout section configured to generate a synthetic image of the selected one or more images,
   wherein the image analyzer, the tag information assignor, the first assignment ratio calculator, the second assignment ratio calculator, the tag ranking determiner, the image selector and the image layout section are composed of hardware or a programmed computer.

2. The image processing device according to claim 1, wherein the tag ranking determiner subtracts the first assignment ratio from the second assignment ratio to calculate a difference therebetween for the each piece of common tag information and ranks the each piece of common tag information such that a piece of common tag information having a larger difference is higher in rankings.

3. The image processing device according to claim 1, wherein the second assignment ratio calculator calculates, as the second assignment ratio of the each piece of common tag information for the each user, a ratio of dividing a number of assignments of the each piece of common tag information assigned to images owned by the each user by a number of images owned by the each user.

4. The image processing device according to claim 3, wherein the first assignment ratio calculator calculates the first assignment ratio of the each piece of common tag information by summing up second assignment ratios of the each piece of common tag information assigned to images owned by the plurality of users and averaging a sum of the second assignment ratios.

5. The image processing device according to claim 3, wherein the first assignment ratio calculator calculates, as the first assignment ratio for the each piece of common tag information, a ratio of dividing a number of assignments of the each piece of common tag information assigned to images owned by the plurality of users by a number of images owned by the plurality of users.

6. The image processing device according to claim 3, wherein, when a single image is assigned with a same piece of common tag information twice or more times, the first assignment ratio calculator and the second assignment ratio calculator regard a number of assignments of the same piece of common tag information assigned to the single image as a number of assignments of the piece of common tag information to calculate the first assignment ratio and the second assignment ratio of the piece of common tag information.

7. The image processing device according to claim 3, wherein, when a single image is assigned with a same piece of common tag information twice or more times, the first assignment ratio calculator and the second assignment ratio calculator regard a number of assignments of the same piece of common tag information assigned to the single image as one to calculate the first assignment ratio and the second assignment ratio of the piece of common tag information.

8. The image processing device according to claim 3, wherein the first assignment ratio calculator and the second assignment ratio calculator calculate the first assignment ratio and the second assignment ratio by weighting a number of assignments of the each piece of common tag information such that a weight becomes smaller from the latest toward the past.

9. The image processing device according to claim 1, wherein, in order to select one or more images having the one or more objects for use in the synthetic image from images owned by a user, the image selector selects one or more images having an object corresponding to a piece of common tag information in order from the highest rank toward the lowest rank of pieces of common tag information.

10. The image processing device according to claim 1, wherein, in order to select one out of two or more images having a same constitution but different objects from images owned by a user, the image selector selects a single image having an object corresponding to a piece of common tag information in order from a highest rank toward a lowest rank of pieces of common tag information.

11. The image processing device according to claim 1, further comprising an image ranking determiner configured to rank an image based on a rank of the each piece of common tag information assigned to images owned by the each user,
wherein the image ranking determiner is composed of hardware or a programmed computer.

12. The image processing device according to claim 11, wherein, when an image is assigned with two or more pieces of common tag information, the image ranking determiner ranks the image based on a rank of a piece of common tag information having a highest rank among the two or more pieces of common tag information.

13. The image processing device according to claim 12, wherein the image selector is further configured to select one or more images from images owned by the user based on a rank of the image.

14. The image processing device according to claim 11, wherein, when an image is assigned with two or more pieces of common tag information, the image ranking determiner ranks the image based on a rank of a piece of common tag information corresponding to a sum of differences each between the first assignment ratio and the second assignment ratio of each of the two or more pieces of common tag information.

15. The image processing device according to claim 11, wherein, when an image is assigned with two or more pieces of common tag information, the image ranking determiner ranks the image based on a rank of a piece of common tag information corresponding to a sum of differences each between the first assignment ratio and the second assignment ratio of each of the two or more pieces of common tag information, the differences between the first assignment ratio and the second assignment ratio of each of the two or more pieces of common tag information being weighted in accordance with areas of two or more objects corresponding to the two or more pieces of common tag information.

16. The image processing device according to claim 1, wherein the image layout section is further configured to arrange two or more images each having the object in the synthetic image such that a size of an image with an object corresponding to a piece of common tag information having a higher rank is larger than a size of an image with an object corresponding to a piece of common tag information having a lower rank.

17. The image processing device according to claim 1, wherein the image processing device performs image analysis, assignment of the tag information, calculation of the first assignment ratio and the second assignment ratio and determination of a rank of a piece of common tag information every time a new image is added.

18. An image processing method comprising:
carrying out image analysis on an image, with an image analyzer;
assigning the image with one or more pieces of tag information corresponding to one or more objects present in the image based on a result of the image analysis, with a tag information assignor;
calculating an assignment ratio of each piece of common tag information assigned to images owned by a plurality of users, which is a ratio of a number of assignments of the each piece of common tag information assigned to images owned by the plurality of users with respect to a number of images owned by the plurality of users, as a first assignment ratio, with a first assignment ratio calculator, the each piece of common tag information being a piece of tag information assigned to and shared by images owned by the plurality of users;
calculating an assignment ratio of the each piece of common tag information assigned to images owned by each user, which is a ratio of a number of assignments of the each piece of common tag information assigned to images owned by the each user with respect to a number of images owned by the each user, as a second assignment ratio, with a second assignment ratio calculator;
ranking the each piece of common tag information assigned to images owned by each user based on a difference between the first assignment ratio and the second assignment ratio of the each piece of common tag information, with a tag ranking determiner;
selecting one or more images from images owned by a user based on a rank of the each piece of common tag information, with an image selector; and
generating a synthetic image of the selected one or more images, with an image layout section,
wherein the image analyzer, the tag information assignor, the first assignment ratio calculator, the second assignment ratio calculator, the tag ranking determiner, the image selector and the image layout section are composed of hardware or a programmed computer.

19. A non-transitory computer readable recording medium having recorded thereon a program for causing a computer to execute each step of the image processing method according to claim 18.

* * * * *